United States Patent [19]

Roberson et al.

[11] 4,036,931
[45] July 19, 1977

[54] BAYER PROCESS PRODUCTION OF ALUMINA

[75] Inventors: Morris L. Roberson; John W. Beck; Jack S. Maples, all of Baton Rouge; Anthony Savariste, Plaquemine, all of La.; Donald J. Donaldson, Orinda, Calif.; David L. Stein; Allan C. Kelly, both of Pleasanton, Calif.

[73] Assignee: Kaiser Aluminum & Chemical Corporation, Oakland, Calif.

[21] Appl. No.: 699,828

[22] Filed: June 25, 1976

[51] Int. Cl.² .............................................. C01F 7/06
[52] U.S. Cl. ................................. 423/121; 423/127; 423/129; 210/45; 210/59; 210/42 R
[58] Field of Search ............... 423/119, 121, 127, 129; 210/42, 45, 59

[56] References Cited

U.S. PATENT DOCUMENTS

| 2,375,343 | 5/1945 | Brown | 423/121 |
| 2,420,852 | 5/1947 | Archibald | 423/129 |
| 2,981,600 | 4/1961 | Porter | 423/130 |
| 3,560,148 | 2/1971 | Tamise et al. | 423/122 |

FOREIGN PATENT DOCUMENTS

| 1,158,048 | 7/1969 | United Kingdom | 423/122 |

*Primary Examiner*—Herbert T. Carter
*Attorney, Agent, or Firm*—Paul E. Calrow; Andrew E. Barlay

[57] ABSTRACT

A process is provided which allows control of the impurity level of Bayer process streams with simultaneous generation of an environmentally acceptable effluent and recovery of valuable dissolved aluminum and sodium values. The process involves carbonation of a blow-down stream at 40°–100° C to produce sodium dawsonite [NaAl(OH)$_2$CO$_3$] and an effluent essentially free of dissolved alumina and significantly depleted in dissolved sodium. The sodium dawsonite can be used as such or returned to the Bayer process after thermal decomposition to sodium aluminate. The effluent can be directly discharged into natural receiving bodies without further treatment.

10 Claims, 2 Drawing Figures

BAYER PROCESS PRODUCTION OF ALUMINA

BACKGROUND OF THE INVENTION

The Bayer process of the most widely used method for the recovery of alumina from aluminiferous ores, such as bauxite. The Bayer process involves digestion of bauxite in a caustic solution, generally sodium hydroxide, usually at elevated temperatures and pressures. Digestion of the ore results in a slurry consisting of a sodium aluminate solution and a caustic-insoluble residue, commonly referred to as "spent bauxite" or "red mud". After digestion is completed, the slurry is cooled and the sodium aluminate solution, referred to as "pregnant liquor" is separated from the spent bauxite. The pregnant liquor is then seeded and/or agitated, and product alumina hydrate is recovered from the liquor by precipitation. The product is separated from the liquor by settling and/or filtration, washed to remove entrained liquor and then dried or calcined. The liquor from which a portion of the dissolved alumina has been removed by precipitation is referred to as "spent liquor" and is recycled to the digestion step after adjustment of its caustic content by evaporation and/or addition of replacement or make-up caustic. The red mud or spent bauxite is washed to recover most of its entrained liquor content and is then removed from the Bayer process.

In the Bayer process practically all process streams are contaminated with impurities, such as sodium chloride, sulfur containing compounds and sodium carbonate. Some of these impurities originate from the bauxite feed material, others are introduced with the caustic solution, settling and filter aids and other additives employed for the control of metallic impurities in the product alumina hydrate.

Since for economical reasons most of the Bayer process streams are recycled the impurities in these streams can steadily increase and rapidly reach levels at which the yield of alumina will be significantly affected. Additionally, increased impurity levels in the streams can cause other problems as well in the processing of bauxite, for example excessive foaming, density and viscosity increase and pronounced scaling on the walls of vessels and pipes used for treating and transporting these streams.

Several methods are in use for the control of impurity levels in Bayer process liquors or streams. One method utilizes, for example, high purity, sodium chloride-free caustic for digestion of the bauxite; evaporative desalting of Bayer streams is also employed, this results in the precipitation of $Na_2CO_3$. If the process stream also contains $Na_2SO_4$, evaporative desalting produces burkeite, which is a $Na_2CO_3$—$Na_2SO_4$ double salt. Purification of the Bayer process streams by ion exchange removal of certain impurities has also been suggested. An alternative purification method involves blow-down or bleeding of a side stream which provides a certain degree of impurity control, however disposal of this side stream may present difficulties and results in the loss of valuable alumina and caustic.

The problem of maintaining the impurity level of Bayer streams at, or below a certain predetermined value is further compounded by strict environmental regulations which impose restrictions on the type and nature of Bayer process effluents which can be discharged into natural receiving bodies.

For example disposal of the spent bauxite slurry by-product of the digestion generates a serious problem both from an environmental and from an economical point of view. In order to avoid contamination of natural bodies of water, the spent bauxite slurry is impounded, usually in large man-made ponds. This solution to the disposal problem, while it satisfies environmental concern, creates severe economic strains on alumina producers since the spent bauxite slurry contains large volumes of aqueous liquor which occupies a large impoundment area. To reduce the area for impoundment it is desirable to remove at least a portion of the aqueous liquor or effluent. This effluent, however, contains impurities, including dissolved aluminum and caustic values, the latter imparting undesirably high pH to the liquor. Also, there may be suspended solids in the effluent and consequently it does not lend itself to direct disposal into natural receiving bodies. removal of the suspended solids and neutralization of the highly caustic effluent is economically prohibitive due to the large volumes to be treated. An economically feasible solution to this problem is the recycling of this effluent to the Bayer process. However, recycling of the effluent to the Bayer process returns impurities to the process streams, thus compounding the already existing purity control problems.

A process has now been discovered which simultaneously provides: (1) control of the impurity level of Bayer process streams, (2) allows, if desired, recycle of the spent bauxite disposal system effluent to the Bayer process without neutralization, (3) recovers valuable aluminum and sodium values and last, but not least, (4) generates an effluent containing only environmentally acceptable salts, such as sodium chloride and bicarbonate, thus allowing its direct discharge in natural receiving bodies. These results can be obtained by selecting a suitable blow-down stream from the Bayer process, carbonating this stream which has a pH in excess of 12 with carbon dioxide in a batch, continuous or semicontinuous manner at 40°–100° C until essentially all of its dissolved alumnia content is precipitated in the form of sodium dawsonite [$NaAl(OH)_2CO_2$] which also results in the recovery of 1 mole of Na/mole of Al and separating the dawsontie from the residual liquor having a pH of about 8.6–9. the dawsonite-free effluent containing only environmentally acceptable dissolved salts can be readily disposed of, for example, into natural receiving bodies, while the sodium dawsonite can be utilized in as-is condition or recycled to the Bayer process after thermal decomposition as sodium alumina.

SUMMARY OF THE INVENTION

In the Bayer process production of alumina hydrate from bauxite by digestion of the bauxite with a caustic solution to produce a sodium aluminate solution and a caustic-insoluble spent bauxite residue, the improvement which comprises selecting for blow-down a stream containing dissolved aluminum and sodium values and having a pH in excess of 12, treating the stream with carbon dioxide at 40°–100° C until substantially all of the dissolved alumina content of the stream is precipitated in the form of sodium dawsonite; separating and recovering the sodium dawsonite from the residual effluent, which is characterized by a pH within the range of about 8.6–9 and a significantly depleted dissolved sodium content containing only environmentally acceptable dissolved salts which allows it direct disposal without further treatment to natural receiving bodies. The sodium dawsonite can be utilized as such, or if desired recycled to the Bayer process either in the form of dawsonite or after thermal decomposition to sodium aluminate. The instant process also allows partial recycle or total recycle of the effluent from the spent bauxite disposal system to the Bayer process without requiring purification.

DETAILED DESCRIPTION OF THE INVENTION

Figure 1:
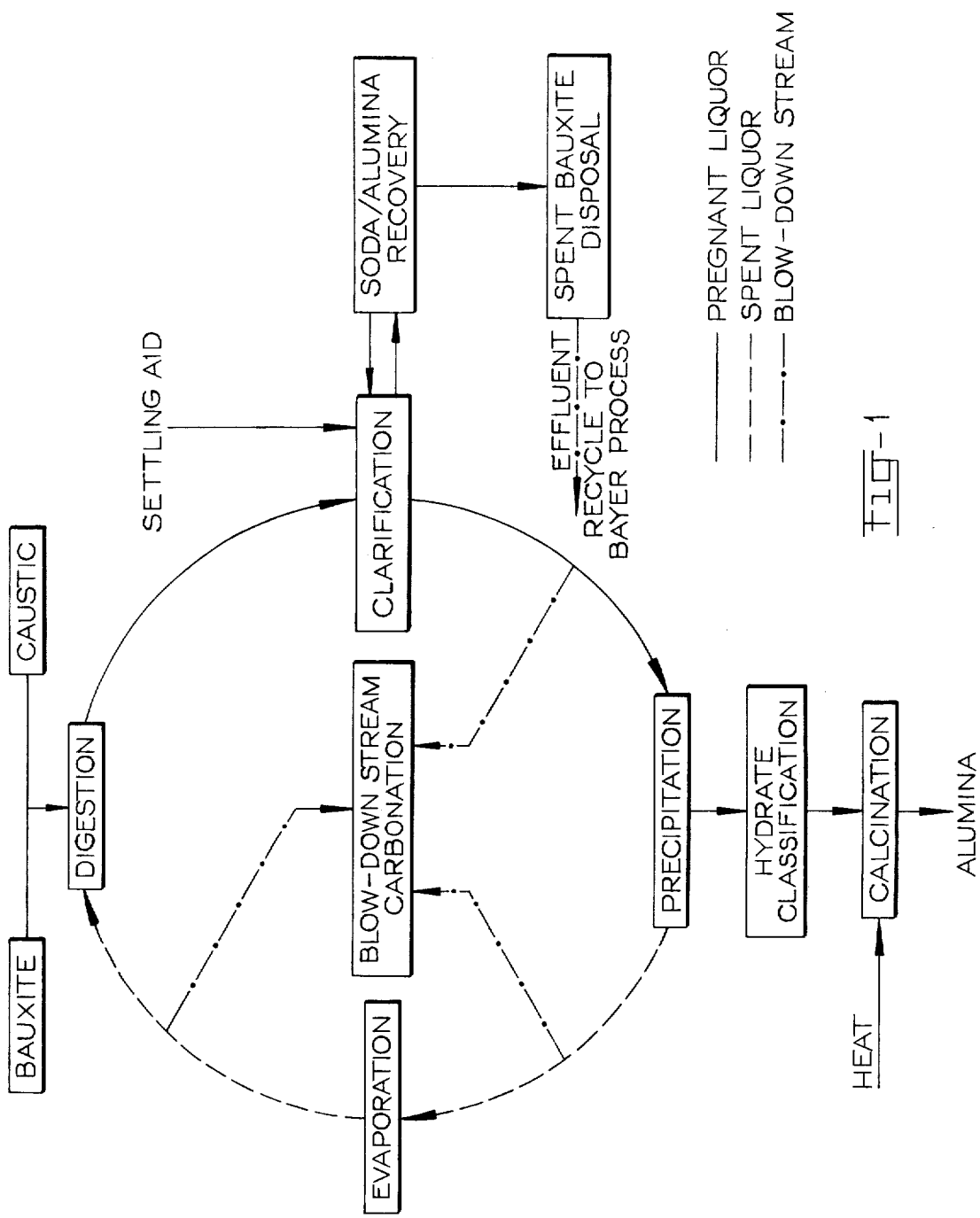
FIG. 1 provides a schematic flow-sheet for the production of alumina hydrate from bauxite by the Bayer process.

The present invention relates to an improvement in the Bayer process production of alumina hydrate from bauxite. More particularly, the instant process provides an economical and efficient method of controlling the impurity level of Bayer process streams, while simultaneously allowing the recovery of valuable dissolved aluminum and sodium values from a blow-down stream and the generation of a suspended solids-free effluent which due to its environmentally acceptable dissolved salt content and pH can be directly discharged into natural receiving bodies. Also, the instant process allows partial or total recycle to the Bayer process of effluents which are generated in a spent bauxite disposal system.

For the purposes of the present invention the terms "Bayer process stream(s)" or "liquor(s)" refer to any caustic solution used or generated in the Bayer process containing dissolved aluminum and sodium values as main components and also containing dissolved inorganic salts and/or caustic soluble organic impurities. Representative streams or liquors falling within the term defined above include without intending to limit the scope thereof: (a) pregnant or green liquor; (b) spent liquor; (c) spent bauxite or mud washing stream, (d) alumina hydrate wash effluent; and (e) spent bauxite disposal system effluent. Combinations by these liquors or streams are also intended to be covered by the above defined terms. The type and nature of these streams is provided hereinafter.

a. Pregnant or green liquor is a caustic aluminate solution resulting from the digestion of bauxite usually at elevated temperatures and pressures. It is supersaturated with regard to dissolved aluminum values present in the liquor as sodium aluminate. The supersaturated sodium aluminate solution remains stable above a certain temperatures which depends on the degree of supersaturation and no decomposition to alumina hydrate occurs in the absence of seeding and/or agitation. Pregnant liquors have high caustic concentrations, generally in American Bayer process practice the range is about 140-200 g/l expressed as $Na_2CO_3$. In European Bayer process practice the caustic concentration can be as high As 240-275 g/l expressed as $Na_2CO_3$. The dissolved aluminum concentration expressed as $Al_2O_3$ is generally about 85-130 g/l in American pregant liquors and about 140-165 g/l in European pregnant liquors. The pH of these caustic liquors is substantially in excess of 12, generally in the neighborhood of 14.

b. Spent liquor is the caustic solution which results after a portion of its dissolved alumina content is removed by precipitation. The caustic concentration of spent liquors is generally the same as that of pregnant liquors, precipitation, however, reduces the alumina content to 50-80 g/l $Al_2O_3$ in the American-type Bayer process and 70-90 g/l $Al_2O_3$ in European-type Bayer process. Spent liquor is usually recycled to the bauxite digestion step after its caustic concentration is re-established to the desired level by evaporation and/or addition of fresh sodium hydroxide.

c. Mud washing or spent bauxite washing stream is the aqueous, caustic and dissolved alumina containing liquor which is obtained by washing the caustic insoluble residue of the digestion with an aqueous medium to remove entrained sodium aluminate. The term mud washing or spent bauxite washing stream includes any stream which results from washing of the spent bauxite or obtained as overflow in the customarily employed thickeners. The caustic concentration of these streams varies greatly depending on many factors, such as mud type and operating conditions, usually the range is between about 5-120 g/l calculated as $Na_2CO_3$ at a 2-75 g/l $Al_2O_3$ level.

d. Alumina hydrate wash effluent is the effluent which is obtained by washing precipitated alumina hydrate to remove entrained sodium aluminate and other impurities, for example oxalate contaminants. The caustic and alumina concentration of the effluent can vary within wide limits, for example between 10-150 g/l expressed as $Na_2CO_3$ and 5-60 g/l $Al_2O_3$, respectively.

e. Spent bauxite disposal system effluent for the purposes of this invention refers to an effluent obtained by drainage and/or decantation from spent bauxite collecting ponds. This effluent, which in many cases is diluted by rainfall, has a widely fluctuating caustic and alumina concentration, also it contains varying quantities of dissolved inorganic salts, for example sodium chloride, sulfur-containing compounds and $Na_2CO_3$. The pH of this effluent generally fluctuates between about 12-13.

For better understanding of the instant invention a brief description is provided of a typical Bayer process production of alumina hydrate from bauxite. As shown in FIG. 1, bauxite is slurried with aqueous NaOH, hereinafter referred to as caustic. The slurry is digested at elevated temperatures and pressures resulting in the extraction of hydrated alumina values from the bauxite. The digested slurry consisting of a sodium aluminate liquor and a caustic insoluble residue (i.e. spent bauxite) is subjected to a separation treatment commonly referred to as clarification. Clarification can involve settling of the slurry and removal of the supernatant pregnant liquor for further processing, it can consist of filtration of the slurry on suitable filters or both. The pregnant liquor obtained in the clarification step is conducted to the precipitation stage, while the spent bauxite is subjected to washing to recover entrained liquor. Subsequently, the washed, spent bauxite, generally in slurry form, is introduced in a disposal system, for example into ponds, where it is allowed to settle and dry. To accelerate the drying of the bauxite, effluent can be removed from the pond. The effluent generated in the spent bauxite disposal stage can be recycled to the Bayer process for environmental reasons and also for the utilization of residual sodium aluminate values.

The pregnant liquor obtained in the clarification step is subjected to precipitation wherein a portion of the dissolved alumina content is recovered in the form of precipitated alumina trihydrate. Separation of the precipitated hydrate from the liquor results in spent liquor, which after evaporation and/or upward adjustment of its caustic content is reused for the digestion of fresh bauxite.

In a conventional Bayer process alumina plant build-up of impurities begins with the start-up of operations. Impurities can be introduced for example through the bauxite, caustic, filter adis and also the flocculant used in the clarification step. The quantity and type of impurities for each Bayer process alumina plant will vary within wide limits. Nevertheless, it can be stated that the following impurities appear in each Bayer process alumina plant regardless of the type of bauxite employed for digestion. Sodium chloride is generally introduced with the caustic solution used for digestion of bauxite, since the caustic solution is usually obtained by the electrolytic preparation of sodium hydroxide from sodium chloride brines. Although removal of residual NaCl from caustic is possible, the methods available are generally uneconomical when applied to caustic solutions to be utilized in the Bayer process. Bayer liquors also contain sodium carbonate generated by the degradation of organic compounds in the caustic medium. Bayer process streams can also contain sulfur compounds. This impurity can be introduced from the many sources, such as the bauxite or, for example, by the addition of $Na_2S$, which is employed in Bayer process plants for the control of zinc contaminant which is sometimes present in bauxite.

As it can be seen from FIG. 1, the typical Bayer process employs extensive recycling of process streams and due to this characteristic the impurity level increases in the process liquors on a day to day basis.

The environmental requirement to impound spent bauxite and to recycle the effluent from the spent bauxite disposal system further increases the impurity level of Bayer process streams and necessitates additional control of the impurities. As already mentioned, the presence of the impurities in the Bayer process seriously affects the operation efficiency and in the absence of suitable control results in ever decreasing alumina trihydrate yields and other undesirable effects, such as scale formation on the walls of process equipment which significantly increases the energy required for the production of alumina trihydrate from bauxite. The methods for controlling the impurity content of Bayer process streams include as already mentioned above, utilization of NaCl-free caustic and ion exchange purification. In addition, it is also known to remove the sodium carbonate impurity content of the Bayer process streams by evaporative crystallization. This method if impurity control, while also capable of controlling the sulfate content of the streams by formation of a carbonate-sulfate double salt during evaporation, requires significant thermal energy not only for the evaporation, but also for the thermal decomposition of the produced salt to convert it to a useful product. Blow-down or bleeding off a side stream from the Bayer process streams has also been utilized for liquor purificaion purposes, however, while this method allows the control of impurities within desired limits, disposal of the blow-down stream or effluent creates serious environmental problems. Thus, it can be seen that all of the prior art purification processes involve either expensive and involved procedures or present environmentally unacceptable solutions to the existing problems.

The present invention in contrast provides an efficient and environmentally acceptable method of controlling the impurity content of impure Bayer process streams, while simultaneousely allowing recovery of valuable alumina and caustic values from a blow-down stream. Additionally, the instant process allows if desired total recycle of the effluent from the spent bauxite disposal system to the Bayer process.

To accomplish the above-referred to advantages of the instant process, a blow-down or bleed off stream is selected from the Bayer process streams. This blow-down stream is then carbonated with gaseous $CO_2$ to recover substantially all of its alumina content in the form of precipitated sodium dawsonite [$NaAl(OH)_2 \cdot CO_2$]. formation of this compound also allows recovery of one mole of sodium per mole of aluminum which further improves the economy of the process. Carbonation also reduces the pH of the resulting aqueous phase, thus allowing the direct disposal of this effluent, after separation of the produced dawsonite, into natural receiving bodies without the requirement of further purification. The produced sodium dawsonite can be either utilized in as-is form, or if desired it can be recycled to the Bayer process either as dawsonite or after thermal decomposition to sodium aluminate.

The choice of which Bayer process stream or combination of streams is to be subjected to the novel treatment remains within the discretion of the Bayer process alumina producer. For economical reasons, it has been found that selection of a stream or a combination of streams containing a sufficiently high caustic anddissolved alumina content, for example in excess of about 50 g/l caustic expressed as $Na_2CO_3$ and in excess of about 20 g/l $Al_2O_3$ provide satisfactory results in terms of efficiency both in purification and in carbonation. Accordingly, the streams recited previously can be readily employed for the instant process provided their caustic and alumina concentrations meet the recommended limits. The present process can be employed for both American and European-type Bayer processes.

Figure 2:
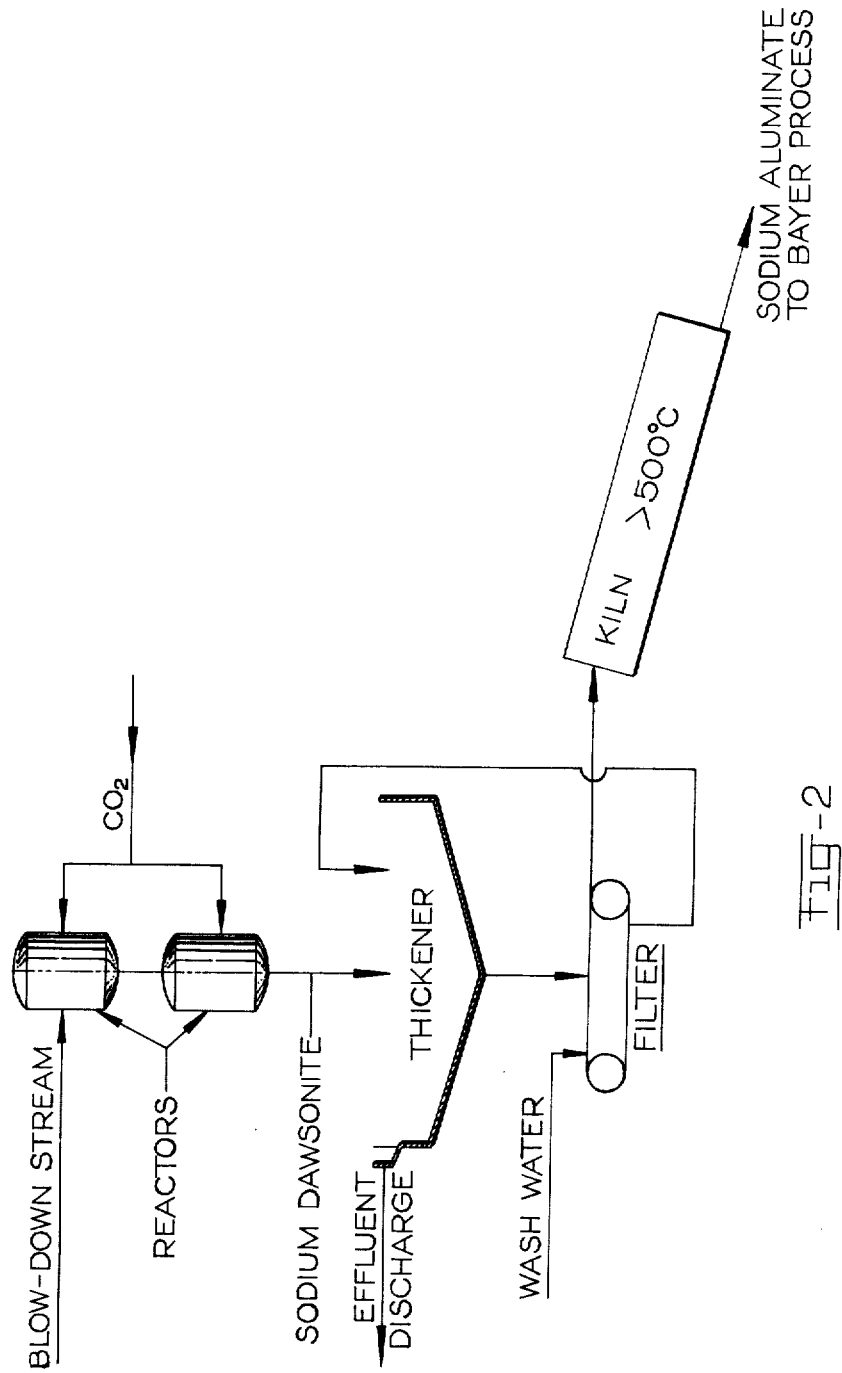
FIG. 2 shows a schematic flow-sheet for the treatment of a Bayer process blow-down stream to recover essentially all of its dissolved alumina content as sodium dawsonite, while simultaneously producing an effluent of pH 8.6-9 which is significantly depleted in dissolved sodium values and containing only environmentally acceptable dissolved salts which allows its direct disposal to natural receiving bodies.

Carbonation of the blow-down stream can be accomplished in a batch, continuous or semi-continuous method. For best results carbonation is carried out within the temperature range. of about 40°–100° C using a single stage, or if desired, a doublestage carbonation system, such as shown in FIG. 2. The reactor employed in the carbonation can be stirred, if the pressure within the carbonation vessel(s) is kept above atmospheric pressure suitable reactors are employed capable of being maintained at the desired pressure. The supply of $CO_2$ to the carbonation vessels is controlled at such a rate as to avoid formation of $Al(OH)_3$, which although a valuable product, does not allow recovery of soda values from the stream in the form of sodium dawsonite. The required rate of $CO_2$ addition is generally established by measuring the pH of the system during carbonation. It has been found that substantially all of the dissolved alumina content of the stream can be converted to sodium dawsonite when the carbonation mixture is kept at a pH between about 9.0–10.00 during the process.

Subsequent to completion of the carbonation the formed sodium dawsonite can be either directly separation from the slurry or if desired the slurry can be thickened to increase its solids concentration. Separation of the precipitated sodium dawsonite from the liquor can be readily accomplished by any of the known solid-liquid separation methods. Thus, it is possible to employ conventional filters, centrifuges or for example decantation. After separation of the produced sodium dawsonite from the effluent, the effluent having a pH within the range of about 8.6-9.0 and containing only environmentally acceptable dissolved salts can be directly discharged without requiring further purification to natural receiving bodies or communal disposal systems.

Recovery of sodium dawsonite from the blow-down stream is generally about 95% or more calculated on the dissolved alumina content of the blow-down stream and sodium dawsonite yields in the range of about 93-95% can be readily obtained by controlling the process parameters within the limits given above. The produced sodium dawsonite is of high purity thus rendering it capable for use in the as-is condition, for example as a flameretardent filler or for other known purposes.

If desired the sodium dawsonite can be subjected to thermal decomposition at temperatures within about 500°-800° C to produce sodium aluminate which can be either recycled to the Bayer process or used for other purposes, for example for waste water purification or as a result of its high purity for utilization in the paper industry.

Thus, it can be seen that the instant process provides an efficient and economical method which allows simultaneously the fulfillment of the objects set forth above.

The following example is present to further illustrate the efficacy of the instant process without however intending to limit the scope of the invention to the embodiment described therein.

EXAMPLE

A blow-down stream was removed from the Bayer process and its composition, including its impurity content, is shown in Table I. This blow-down stream was then subjected to carbonation according to the schematic diagram shown in FIG. 2 by continuously introducing it into a stirred reactor at the rate of 817.5 l/min (216 gpm) and $CO_2$ was introduced into the reactor at the rate of 42.71 kg/min. (61.5 metric t/day) at 7.03 kg/cm² (100 psi) pressure. The temperature in the reactor was kept at 66.8°-71.1° C (150°-160° F) during carbonation and the slurry produced in the reactor was charged to a second reactor, which was kept at the same temperature as the first reactor, where carbonation of the stream was completed by addition of 3.34 kg/min $CO_2$. The slurry removed from the second reactor had a solids content of about 5% and the pH of the aqueous phase was about 8.8. The slurry was then introduced into a thickener where its solids content was increased to about 17%. Subsequently, the slurry was filtered and the produced sodium dawsonite filter cake was washed. The wash liquor and the effluent were combined and the composition of this effluent was determined. The results are shown in Table I. The sodium dawsonite, which was produced at the rate of 90 kg/min and at a yield of about 93% (calculated on the basis of the dissolved almunia content of the blow-down stream) had a purity in excess of 95% and its composition is shown in Table II. The sodium dawsonite was thermally decomposed at about 680° C to sodium aluminate which after dissolving was reintroduced into the Bayer process in a 50% by weight concentration.

The results of this Example clearly show the advantages of the instant process which not only allows controls of the impurity content of Bayer process streams but also provides an efficient and economical way to recover valuable alumina and sodium values from a blow-down stream with the simultaneous generation of an environmentally acceptable effluent which can be directly discharged to natural receiving bodies without further purification.

TABLE I

| Composition | Blow-down stream | Effluent after Carbonation |
|---|---|---|
| $Al_2O_3$ in g/l | 39.3 | 0.0 |
| Caustic as g/l | 60.9 | 0.0 |
| $Na_2CO_3$ | 0 | 51 |
| $NaHCO_3$ g/l | 6 | 6 |
| NaCl g/l | | |
| Total S as $Na_2SO_4$ g/l | 20 | 20 |
| $Na_2CO_3$ g/l | 14 | 2 |
| pH | <13 | 8.8 |
| Spec. gravity g/cm3 | 1.10 | 1.05 |

TABLE II

| COMPOSITION OF SODIUM DAWSONITE | | |
|---|---|---|
| Composition | Actual % | Theoretical % |
| $Na_2O$ | 20.96 | 21.53 |
| $Al_2O_3$ | 36.20 | 35.40 |
| $CO_2$ | 29.77 | 30.56 |
| $H_2O$ | 13.07 | 12.51 |

What is claimed is:

1. In the Bayer process production of alumina from bauxite by digestion of the bauxite with a caustic solution to produce a sodium aluminate solution and a caustic-insoluble spent bauxite residue, the improvement which comprises selecting for blow-down a Bayer process stream having a pH in excess of about 12, caustic concentration expressed as $Na_2CO_3$, in excess of about 50 g/l and a dissolved alumina content, expressed as $Al_2O_3$, in excess of about 20 g/l, treating the stream with $CO_2$ within the temperature range of about 40°-100° C until substantially all of the dissolved alumina content of the stream is precipitated as sodium dawsonite; separating and recovering the sodium dawsonite from the carbonated blow-down stream which after removal of its sodium dawsonite content is characterized by a pH within the range of about 8.6-9 and an environmentally acceptable dissolved salt content which allows its direct disposal into naural receiving bodies.

2. Process according to claim 1, wherein the pH of the blow-down stream is maintained within the range of about 9-10 during the carbonation step.

3. Process according to claim 1, wherein the blow-down stream is selected from the group of Bayer process streams consisting essentially of pregnant liquor, spent liquor, mud washing stream, alumina hydrate wash effluent, spent bauxite disposal system effluent and combinations thereof.

4. Process according to claim 3, wherein the blow-down stream is a combined stream of pregnant liquor and spent bauxite disposal system effluent.

5. Process according to claim 3, wherein the blow-down stream is a combined stream of pregnant liquor and mud washing stream 6. Process according to claim 3, wherein the blow-down stream is a combined stream of pregnant liquor and alumina hydrate wash effluent.

7. Process according to claim 3, wherein the blow-down stream is a combined stream of spent liquor and spent bauixte disposal system effluent.

8. Process according to claim 3, wherein the blow-down stream is a combined stream of spent liquor and alumina hydrate wash effluent.

9. Process according to claim 3, wherein the blow-down stream is a combined stream of spent liquor and mud washing stream.

10. Process according to claim 1, wherein the recovered sodium dawsonite is thermally decomposed to sodium aluminate within the temperature range of about 500°–800° C and the sodium aluminate is returned to the Bayer process.

* * * * *